(12) United States Patent
Rudoff et al.

(10) Patent No.: US 6,263,378 B1
(45) Date of Patent: Jul. 17, 2001

(54) SYSTEM AND METHOD FOR RAPID DEVELOPMENT OF BOOTSTRAP DEVICE DETECTION MODULES

(75) Inventors: Andrew M. Rudoff, Boulder; Timothy P. Haley, Lafayette, both of CO (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 08/657,186

(22) Filed: Jun. 3, 1996

(51) Int. Cl.[7] .................................................. G06F 13/00
(52) U.S. Cl. ................................................ 709/327; 713/2
(58) Field of Search .................................... 395/651, 681, 395/652, 653, 500, 680; 713/1, 2, 100; 709/100–108, 300–305, 310–332; 717/4

(56) References Cited

U.S. PATENT DOCUMENTS

| | | | |
|---|---|---|---|
| 5,276,877 | * 1/1994 | Friedrich et al. | 709/105 |
| 5,339,432 | * 8/1994 | Crick | 395/651 |
| 5,630,076 | * 5/1997 | Saulpaugh et al. | 395/284 |
| 5,640,562 | * 6/1997 | Wold et al. | 713/2 |
| 5,668,992 | * 9/1997 | Hammer et al. | 395/651 |
| 5,787,019 | * 7/1998 | Knight et al. | 709/324 |
| 5,796,951 | * 8/1998 | Hamner et al. | 395/200.53 |
| 5,802,365 | * 9/1998 | Kathail et al. | 709/321 |
| 5,828,851 | * 10/1998 | Nixon et al. | 710/105 |
| 5,862,052 | * 1/1999 | Nixon et al. | 713/1 |
| 5,867,730 | * 2/1999 | Leyda | 710/10 |

OTHER PUBLICATIONS

Oney, Walter, "Building Device Drivers That Conform to Windows 95 Plug and Play", Microsoft Systems Journal, pp(31), Dec. 1995.*

Oney, Walter, "Plug and Play", WIndows Developer's Journal, pp (6), Dec. 1995.*

Tomlinson, Paula, "Plug and Play Aware Applications", Windows Developer's Journal, pp (8), Jan. 1996.*

"IEEE Standard for Boot (Initialization Configuration) Firmware: Core Requirements and Practices", IEEE Std 1275–1994, Mar. 1994, pp. 1–96, Annex F, also pp. 229–237.

"Forth Quick–Start Introduction", Elcomp Publishing, Inc., 1989.

"Upgrading and Repairing PC's", 4th Edition, S. Mueller, QUE Corporation 1994, Chapter 5, pp. 95–157.

* cited by examiner

*Primary Examiner*—St. John Courtenay, III
(74) *Attorney, Agent, or Firm*—Beyer, Weaver & Thomas LLP (57) ABSTRACT

A bootstrap system for a computer with peripheral devices has a first level boot firmware program and a second level boot program loaded from disk by the first level program. The second level boot program contains a device tree constructed according to IEEE-1275 (Open Firmware) standards, describing currently known peripheral devices and computer resource allocations. The device tree is modifiable during boot operations to incorporate information about additional devices. The second level boot program scans I/O buses for additional devices not included in the current device tree and loads drivers only for the additional devices. The second level boot program further allows a user to enter information into the device tree. The second level boot program is preferably implemented under DOS emulation, and may be developed in a DOS-based code development environment and ported to the computer.

23 Claims, 5 Drawing Sheets

SYSTEM AND METHOD FOR RAPID DEVELOPMENT OF BOOTSTRAP DEVICE DETECTION MODULES

BACKGROUND OF THE INVENTION

1. Field of the Invention

This invention pertains generally to bootstrap systems and programs for loading operating systems into a computer, and more particularly to bootstrap systems and programs that detect peripheral devices, assign computer resources to these devices and eliminate resource probe conflicts.

2. Description of the Background Art

One important function of any computer operating system is the allocation of computer system resources to peripheral devices. These resources typically include input-output (I/O) port addresses, interrupt request channels (IRQ's), direct memory access (DMA) channels and memory address space. These resources are utilized by peripheral components such as disk drives, video monitors, keyboards, printers, network communication devices, "Small Computer Systems Interface" (SCSI) devices, modems, and the like. These are characterized as "I/O" devices, in the sense that they are all external to the central processor unit and main random access memory (RAM) in the computer. In addition, some operating systems, such as the operating systems sold under the trademark UNIX®, also characterize parts of the computer as "internal" I/O devices, sometimes termed "software devices" or "pseudo-devices", which are not physically separate components of the computer. ("UNIX" is a registered trademark of UNIX System Laboratories, Inc.)

Modern computer operating systems must be designed to accommodate a wide variety of I/O devices, since different computer users generally want to connect different peripheral devices to a computer, and these devices often come from different sources. Users also want to be able to add peripheral devices to existing computer systems. Furthermore it is desirable to allow internal devices to be controlled in different ways by the system. Therefore the problems of flexibility and adaptability are very important in the handling of I/O devices by any practical operating system. With the rapid proliferation of different systems and devices, these problems have become more serious and are currently of major importance in the industry.

Computer components generally communicate with each other by means of a bus, which is a common pathway through which data passes between computer elements. Although early computer systems were designed with every component connected to a single bus, modern systems employ a variety of different buses in order to maximize the efficiency of information flow; e.g. a computer may include a processor bus, memory bus, address buses, and one or more I/O buses. Each I/O device communicates with the rest of the computer through an I/O bus. The I/O bus is also termed an expansion bus, because peripheral devices are attached to the system by connecting them to the I/O bus. These buses have various different architectures. The original PC I/O bus architecture was termed the "Industry Standard Architecture" (ISA), introduced in 1982. Since then, buses with a variety of improved architecture types have become available, e.g. Micro Channel Architecture (MCA), Extended Industry Standard Architecture (EISA), Peripheral Component Interconnect (PCI) architecture, and Personal Computer Memory Card International Association (PCMCIA) architecture. Each peripheral device is connected via an I/O bus to the computer motherboard, which is the circuit board on which the central processor unit (CPU) resides, through an adapter card. The adapter card translates information to and from the bus protocol.

When the computer is first turned on, or "booted", it is controlled initially by the bootstrap ("boot") program, which may reside as "firmware" in a programmable read-only memory in the computer (boot PROM), or on a floppy disk. Although in older computer systems, resources could be allocated to peripherals by setting jumpers or switches on the adapter cards, many current boot programs carry out the determination of the peripheral device configuration by means of the boot program before loading the operating system. This determination entails first detecting the presence and type of peripheral devices connected to the I/O bus, and then assigning resources, such as I/O port addresses and IRQ's to each peripheral device. The peripheral devices are detected by drivers that are included in the boot program. Each driver scans the I/O bus to detect a particular type of peripheral device and then assigns computer resources to that device.

The determination of the device configuration by means of conventional firmware as described above has the drawback that conflicts between computer resources may occur during this determination. Each driver scans the system to determine the presence of corresponding peripheral devices, independently of other drivers that may have previously scanned the system. In assigning resources to a peripheral device, the driver may inadvertently cause another device to reprogram itself and vitiate the allocation by another driver. This phenomenon is known as a probe conflict, and can manifest itself as a system hang or reset, or the failure of a peripheral device to operate. The likelihood of probe conflicts increases as more peripheral devices and adapter cards are added to the system. In order to resolve these conflicts it may be necessary to change switches or jumpers on one or more adapter cards, which can be a time-consuming and troublesome procedure.

The problem of probe conflicts is solved automatically in some of the newer bus architectures, such as PCI, EISA, MCA and PCMCIA. Adapter cards for these buses provide means for devices to be self-identifying and generate device configurations automatically. Computer system standards, known as "Plug and Play", have been developed to provide software detection and configuration of peripheral devices without probe conflicts by any system that adheres to these standards. However these standards have not been universally adopted, and also they do not provide all of the necessary self-identification information to enable any system to implement automatic device configuration. There are a great number of adapter cards and devices, known as legacy devices, that operate under the older ISA bus architecture. This architecture does not have "Plug and Play" capability, and probe conflicts remain a potential problem.

Probe conflicts can arise in another way when a computer is running under certain operating systems of the UNIX® type, such as the Solaris® operating system. ("SOLARIS" is a registered trademark of Sun Microsystems, Inc.) When the Solaris® operating system is booted on some platforms, it loads every driver and again scans the computer system for devices, both peripheral and internal. Since the real-mode drivers, i.e. drivers that control peripheral devices during booting, are completely different from the Solaris® drivers that control internal devices, the probe conflict situations may also differ and the risk of probe conflicts from certain configurations is even greater.

The foregoing problems have been addressed in the design of the Open Firmware architecture described in the publication entitled "IEEE Standard for Boot (Initialization Configuration) Firmware: Core Requirements and Practices", IEEE Standard 1275-1994, published by the Institute of Electrical and Electronics Engineers, Inc. This architecture is independent of the hardware environment and operating system of the computer, and provides for "plug-in" device drivers which are located on the peripheral devices that are added to the system, and are written in a machine-independent interpreted language that is similar to the FORTH programming language. The architecture further provides a data structure called a "device tree" that describes the device configuration of the computer system and may be accessed by the operating system. This device tree eliminates the necessity for probing, since it carries information concerning each device in the system which would otherwise be ascertained by the probing process. Finally, the Open Firmware architecture provides a programmable user interface utilizing the device driver language described above, with facilities for debugging hardware and software. While the Open Firmware standard (IEEE 1275) proposes a solution to the device configuration problem, this standard has not been adopted universally in the industry.

Therefore it is desirable to provide an environment for developing programs to detect devices on an I/O bus and build a device tree that is compliant with IEEE-1275 standards and determines the device configuration. It is further desirable to provide debugging capabilities for such programs to enable rapid and efficient development.

SUMMARY OF THE INVENTION

An embodiment of the disclosed bootstrap system provides a dual level boot program. The first level is a small program residing as firmware that loads the second level boot program from disk into memory and transfers control to the second level boot program. The second level boot program contains a program termed a "configuration assistant" that includes currently known device configuration information and builds a device tree based on this information. This device tree is compliant with IEEE-1275 standards. Based on the information in the device tree, the configuration assistant loads only those real-mode drivers that are necessary to complete the boot process. The configuration assistant further includes a program, termed a "bus enumerator", that scans the I/O buses and identifies peripheral devices.

An embodiment of the invention provides an emulator of a preferred environment for developing the configuration assistant. For example, the environment may emulate DOS (disk operating system). The emulation allows a programmer to write and debug the configuration assistant and convert the program to binary form which can be incorporated into the second level boot program. The configuration assistant generates instructions for building or modifying a device tree that complies with IEEE-1275 standards. For example, the configuration assistant may be written on an x86 platform to create specific DOS files, and these files are converted by the emulator to cause device operations that build the IEEE-1275 compliant device tree.

DETAILED DESCRIPTION OF THE PREFERRED EMBODIMENTS

Figure 1:
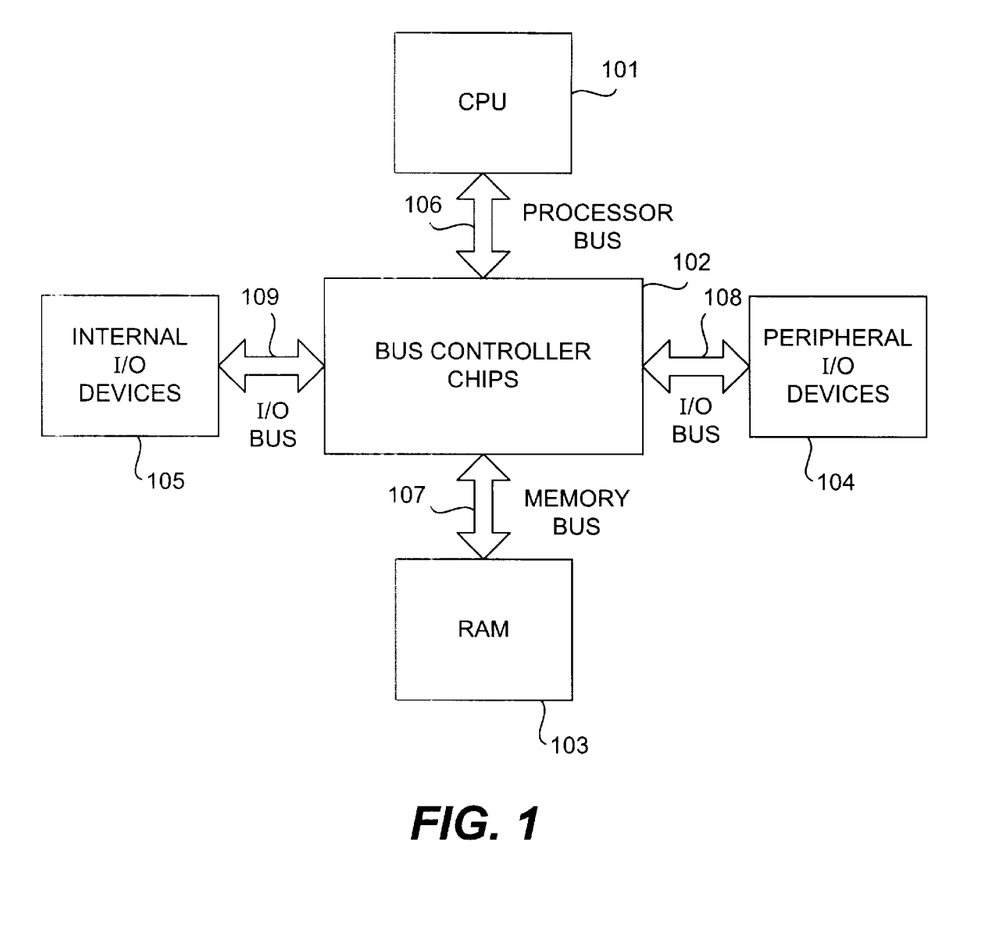
FIG. 1 is a schematic block diagram of a typical bus structure for a computer system that utilizes the present invention.

FIG. 1 shows schematically a bus structure for a typical computer having a boot system according to the present invention. The computer has a CPU 101, RAM 103, peripheral I/O devices 104, internal I/O devices 105, and a plurality of bus controller chips 102. These bus controller chips 102 control the buses which transfer data to and from the components of the computer, and they also transfer data between different buses. In the example of FIG. 1, the CPU 101 communicates through the processor bus 106 and the RAM 103 communicates through the memory bus 107. The peripheral I/O devices are connected to the I/O bus 108, while the internal devices 105 communicate through another I/O bus 109. All of these buses are connected to the bus controller chips 102.

The bus structure shown in FIG. 1 is not unique, and the invention may be practiced in computer systems with other bus structures. For example, some computers utilize a single bus between all of the components. Because of the different rates at which the individual components process data and the variations in traffic between components, generally it is desirable to provide a plurality of buses to increase the efficiency with which information is processed by the computer system. The present invention relates primarily to buses connecting the I/O devices to the system, which are the I/O buses, 108 and 109, in the example of FIG. 1.

Figure 2:
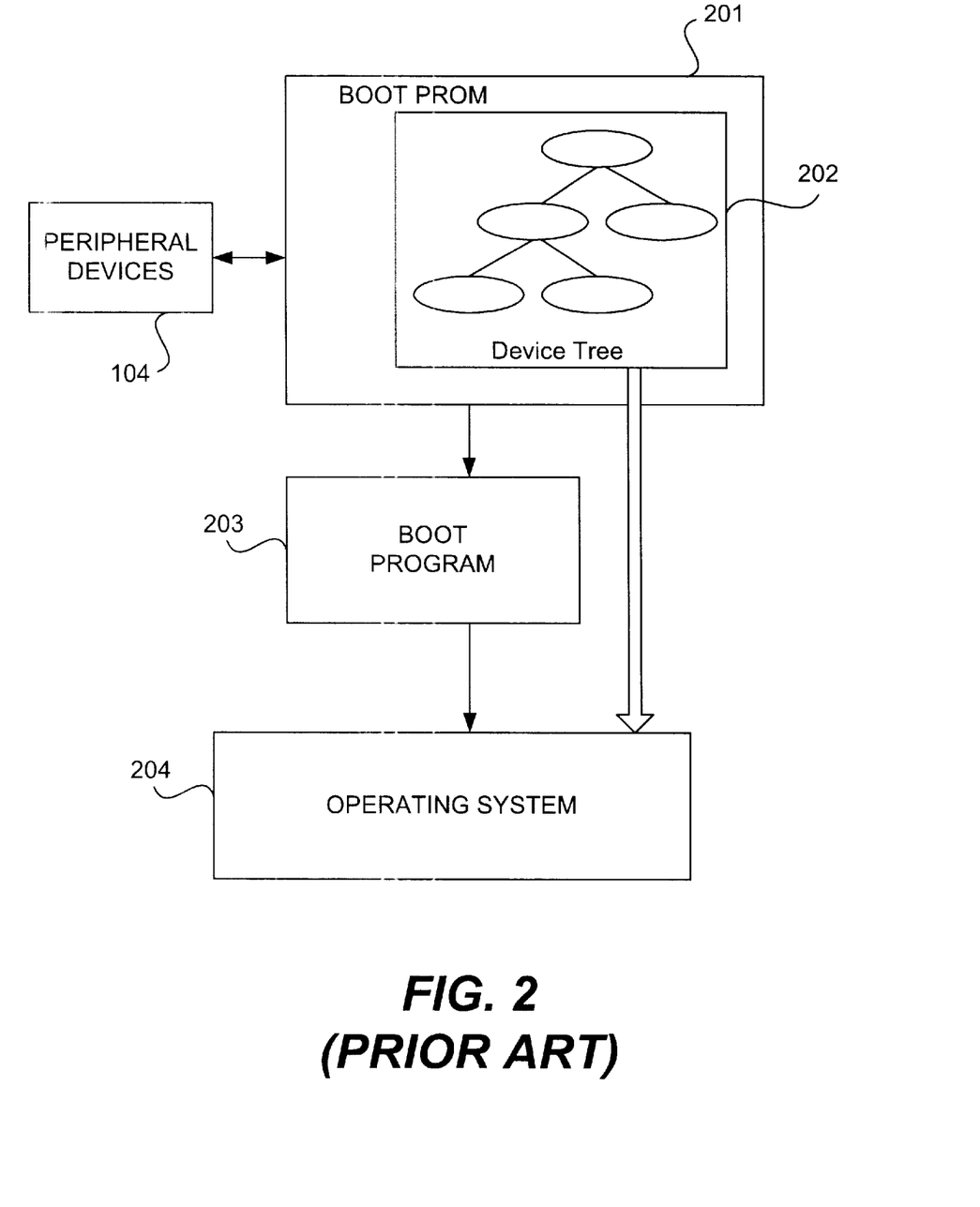
FIG. 2 is a schematic block diagram illustrating the structure of previous boot systems that utilize a device tree.

FIG. 2 is a schematic block diagram of a conventional boot system that utilizes a device tree. This device tree is a data structure 202 residing in the boot PROM 201, which contains information concerning all the peripheral device that the system expects to find when the computer is turned on. This data structure is passed on to the operating system 204. In the system of FIG. 2 the device tree is a fixed structure, and the boot firmware scans the peripheral devices 104 to determine the presence of devices that are not included in the device tree 202. This information is utilized by the boot program 203 which completes the boot process and passes control to the operating system 204. Clearly the drawback of this system is that the device tree 202 is not extensible; the potential for probe conflicts is reduced by the device tree 202, but not eliminated.

Figure 3:
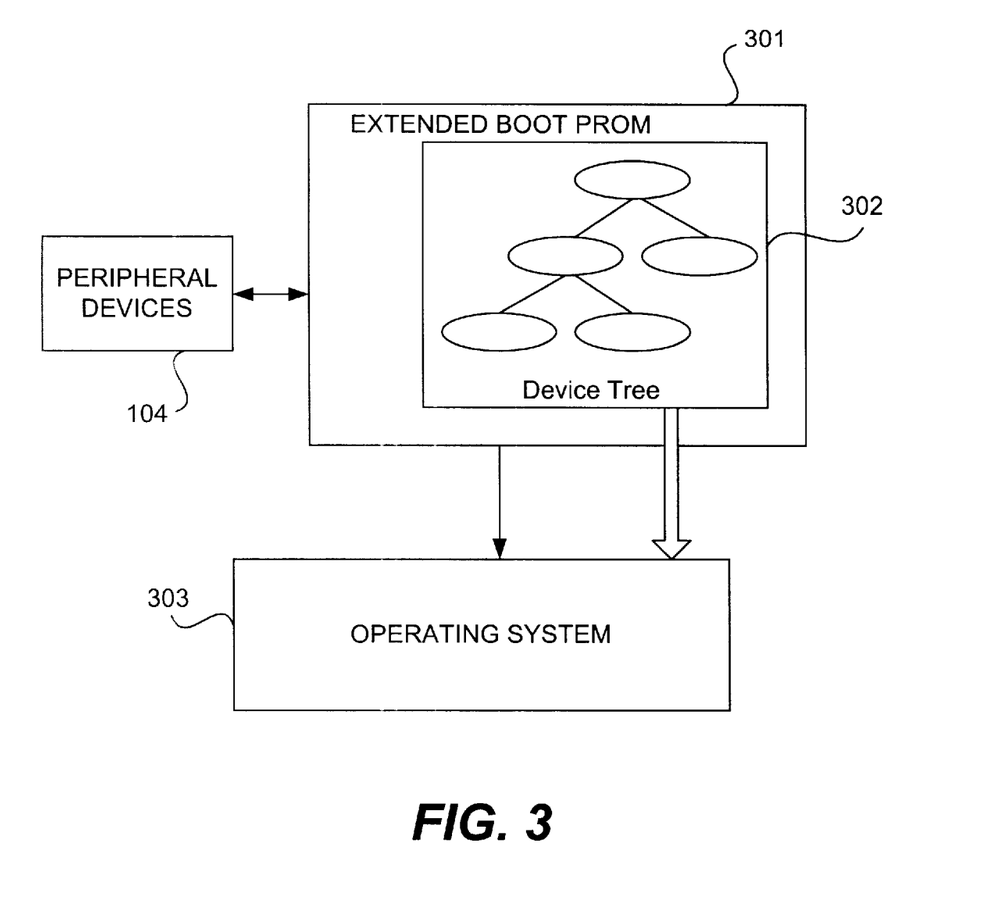
FIG. 3 is a schematic block diagram of the present boot system utilizing a device tree.

FIG. 3 is a schematic block diagram that illustrates an improved boot system according to the present invention, which does not have the inflexibility drawback of previous boot systems. A small first level boot program in firmware (not shown in this Figure) loads a second level extended boot program 301, into a root file system or boot partition. This extended boot program 301 contains the device tree 302 and scans the I/O bus 108 for new peripheral devices 104 using device tree information. When unexpected devices are found the extended boot program 301 modifies the device configuration and updates the device tree 302. Thus the boot process requires loading of drivers only for new peripheral devices; previously existing devices are already incorporated in the device tree 302. Upon completion of the extended boot program, control is passed to the operating system 303, together with the updated device tree 302. For operating systems utilizing internal devices, the same scanning and updating process is carried out.

Figure 4:
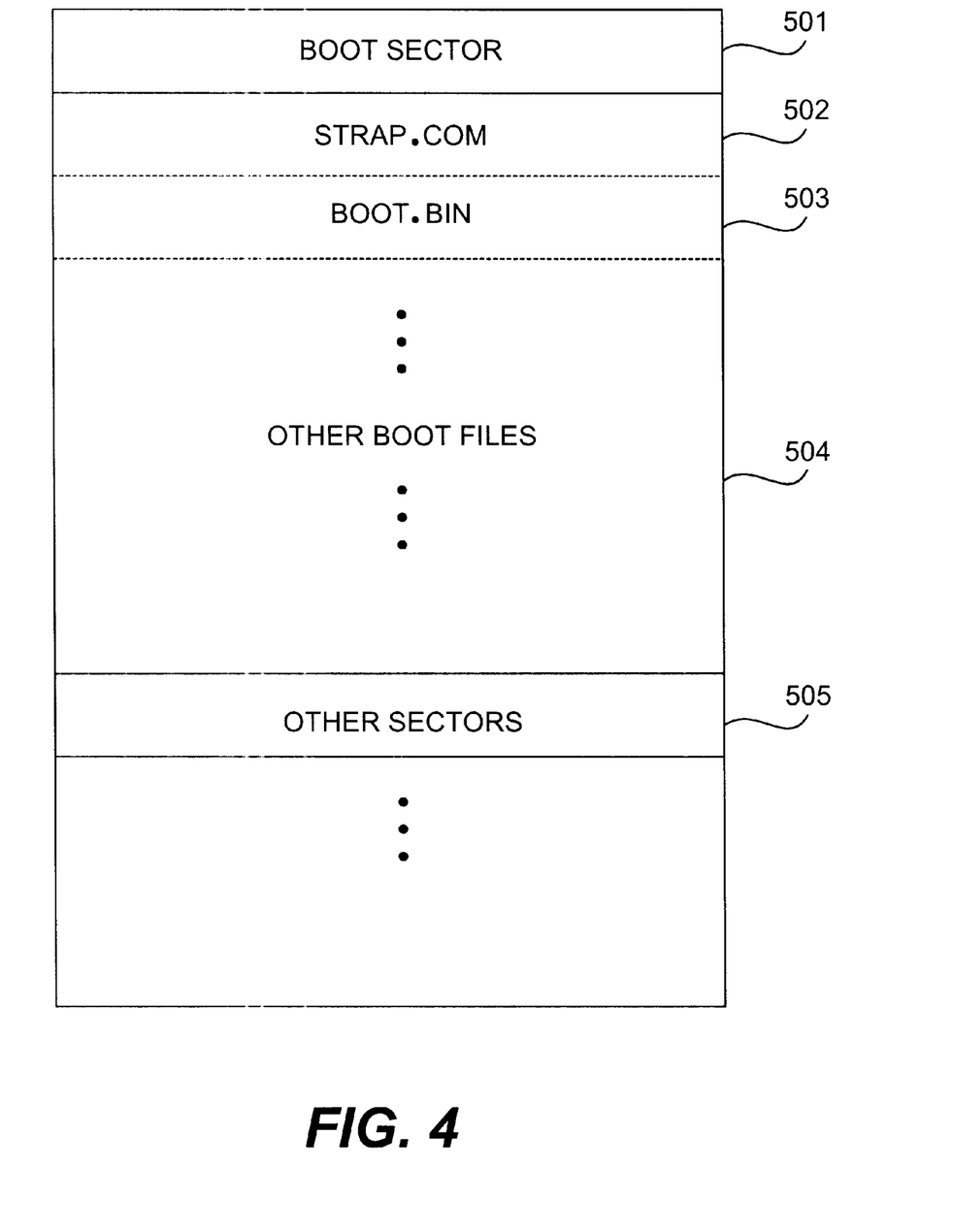
FIG. 4 is a diagram showing the file structure of the present boot system stored on a floppy disk.

Finally, the entire boot system, including the device tree 302, real-mode drivers, and a copy of the first level boot program are collected in a boot directory tree which may be stored on a floppy disk, hard disk, root file system, or boot partition; preferably the directory tree is stored in a plurality of such locations. This directory tree is locally available to the computer system and is updated to include changes in the device configuration. FIG. 4 is a diagram showing the file structure of this directory stored on a floppy disk. The directory is located in a dedicated boot sector 501. The files stored in this sector include the first level boot program 502 entitled "STRAP.COM", the second level program 503 entitled BOOT.BIN, and additional boot files 504. The other sectors on the disk 505 can be utilized for other information.

Figure 5:
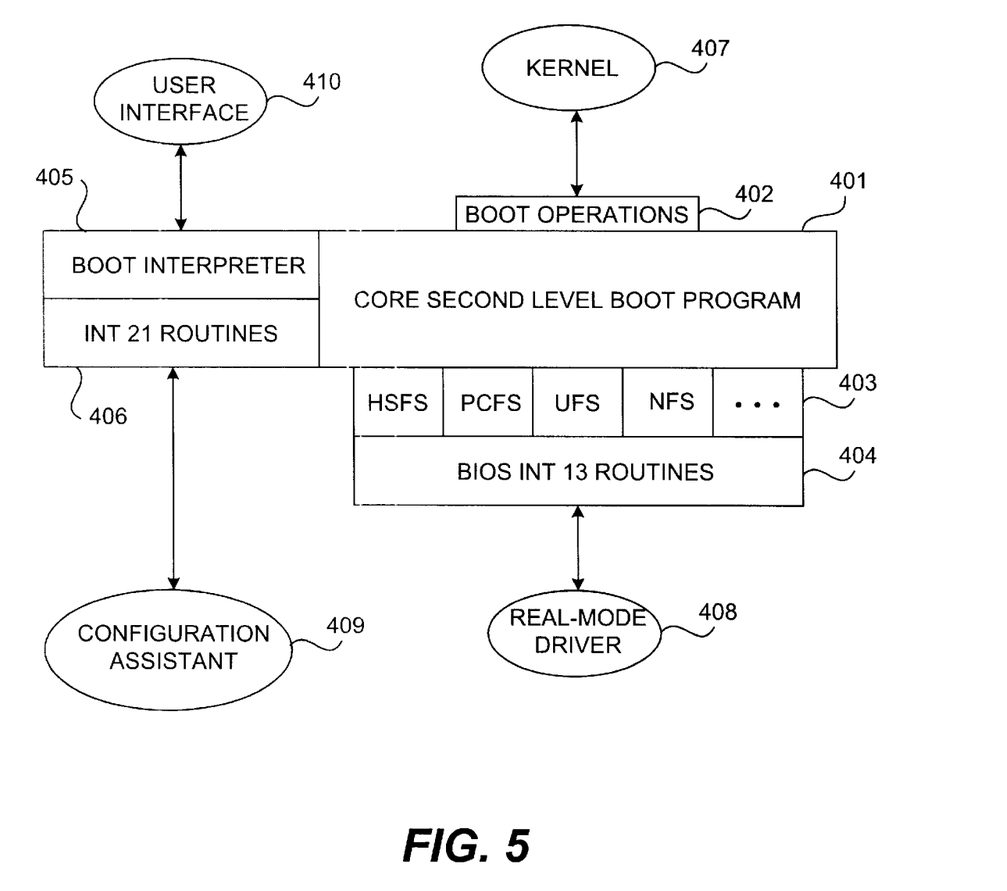
FIG. 5 is a schematic block diagram of the second level boot program according to one embodiment of the invention.

FIG. 5 is a schematic block diagram of the extended boot program 301, according to one embodiment of the invention, illustrating the interaction with the rest of the computer system and the user. The core second level boot program 401 carries out boot operations 402 to load the operating system kernel 407. The interfaces between this core 401 and the rest of the extended boot program are written to emulate a code development environment, which in this example is DOS. The core 401 loads the real-mode drivers 408 through routines 404 that are analogous to DOS BIOS Interrupt 13h routines. The second level boot program 401 has the capability of accessing these drivers as several different types of file systems 403, including HSFS (High Sierra File System), PCFS (Personal Computer File System), UFS (Unix File System), and NFS (Network File System).

The extended boot program includes a configuration assistant 409, which contains the device tree and causes only those real-mode drivers 408 to be loaded that are necessary to complete the boot process. The configuration assistant 409 of this embodiment is designed to emulate a DOS program, and communicates with the core second level boot program through routines 406 that are analogous to DOS Interrupt 21h routines. For example, the configuration assistant 409 carries out commands in DOS ".exe" files. When the computer system is booted the configuration assistant 409 sets up the device tree according to the currently-known device configuration. The configuration assistant 409 further scans the I/O bus by means of a bus enumerator program, labelled by a DOS name such as "ENUM.EXE". If the program detects any unexpected devices, the boot process is interrupted and control is transferred to the user through the user interface 410 and boot interpreter 405. The user may also voluntarily interrupt the boot process through this interface 410. The user interface presents the user with a sequence of displays and menus and includes an input device to allow the user to modify the device configuration and alter the device tree.

In an alternative mode, the bus enumerator may be eliminated from the configuration assistant 409, and the boot process may be carried out by completely trusting the information in the device tree. If any problems arise during this process due to the existence of devices that are not included in the device tree, the boot process is interrupted and control is passed to the user through the user interface 410. In short, it is possible to carry out the boot process without any probing at all.

In this particular example, the configuration assistant 409 is written as a DOS program, which is compiled into a binary file that executes within the extended boot program 301. This provides a great advantage over previous boot programs, in that the routines in the configuration assistant 409 can be developed on a platform that supports DOS, or any other operating system that provides a favorable environment for code development. This makes available all of the code development capabilities and debugging features of other operating systems for generating and modifying the configuration assistant 409. In contrast, previous device configuration programs written in more primitive languages such as FORTH do not have such debugging capabilities and are substantially more difficult to develop, debug and modify.

To summarize, the present boot system provides an improved procedure for developing a device configuration program. First the program is written on a separate platform from the native computer, utilizing an operating system that is preferable for code development. For example, the program may be written on a separate platform under DOS. Secondly, the program creates a device tree that preferably complies with the standards set forth in IEEE-1275. Finally the program is translated into an executable binary file within the extended boot program of the present system.

The foregoing description of the preferred embodiments of the invention has been presented for purposes of illustration and description, and is not intended to be exhaustive or to limit the invention to the precise forms disclosed. Many modifications and variations of the invention are possible in light of the above teaching. It is intended that the spirit and scope of the invention are to be defined by reference to the following claims, along with their full scope of equivalents.

What is claimed is:

1. A boot system for loading a first operating system having an associated file system type interface within a first computer system having a plurality of peripheral devices, the first operating system allocation computer resources to the peripheral devices, the boot system comprising:
    a configuration program capable of obtaining information regarding the peripheral devices of the first computer system and generating or revising a set of device data based on the obtained information prior to loading the first operating system and its associated file system type interface, wherein the configuration program has an associated file system type interface; and
    a boot program arranged to load the first operating system of the first computer system such that the first operating system allocates computer resources of the first computer system based on the device data.

2. A boot system as recited in claim 1 wherein the file system type interface resembles a file system interface of an operating system used in the development of the configuration program.

3. A boot system as recited in claim 1, wherein the device data comprises a device tree.

4. A boot system as recited in claim 1 wherein the operating system type interface resembles an operating system interface of an operating system used in development of the configuration program.

5. A boot system as recited in claim 1 wherein the device data is a data structure that describes the peripheral devices and the allocation of resources to the peripheral devices, and wherein the boot system further comprises instructions for scanning for the peripheral devices that are described outside of said device data, and utilizing information included in the device data to avoid probe conflicts.

6. A boot system as recited in claim 1 wherein the file system type interface provides a plurality of files that represent the device data.

7. A boot system as recited in claim 1 further comprising a user interface that is configurable to modify how the device data is revised or generated.

8. A boot system as recited in claim 1 wherein the configuration program has an associated operating system type interface.

9. A boot system as recite in claim 2 wherein the file system type interface is configured to permit verification of the configuration program by allowing access to the device data in the configuration program using standard file interface commands during development.

10. A boot system as recited in claim 2 wherein the configuration program is written in a programming language that is supported by the operating system used in the development of the configuration program such that debugging tools that are also supported by the operating system used in the development of the configuration program may be implemented to facilitate development of the configuration program.

11. A boot system as recited in claim 2, wherein the device data is a device tree that complies with IEEE 1275 standards.

12. A boot system as recited in claim 4 wherein the operating system type interface permits debugging of the configuration program by using a debugging tool that is compatible with the operating system used in development of the configuration program to interface with the operating type interface.

13. A boot system as recited in claim 10, wherein said device tree complies with IEEE-1275 standards.

14. A method of developing a boot system on a first computer system, the boot system being developed to run during boot up of a second computer system having a plurality of peripherals, the method comprising:

providing a boot system having programming instructions that are arranged to generate device data based on the peripherals of the second computer system and to load the second computer system's operating system and the operating system's associated file system type interface that then allocates computer resources based on the device data, the boot system having a file system type interface that is capable of representing the device data as a plurality of files;

executing the boot system on the first computer system so that device data is generated; and accessing one or more files that represent the device data through the file system type interface.

15. A method as recited in claim 14 further comprising:

determining whether the device data is generated correctly; and modifying the programming instructions of the boot system when the device data is generated incorrectly.

16. A method of developing a boot system on a first computer system, the boot system being developed to run during boot up of a second computer system having a plurality of peripherals, the method comprising:

providing a boot system associated with an operating system type interface that resembles an operating system interface of the first computer system;

adding programming instruction within the boot system that are arranged to generate device data based on the peripherals of the second computer system and then to load the second computer system's operating system and its associated operating system interface that then allocates computer resources based on the device data;

executing the boot system; and verifying that the device data is generated correctly by using a debugging tool that analyzes execution of the boot system through the operating system type interface.

17. A method as recited in claim 16 further comprising providing a file system type interface configured to represent the device data when the boot system is executed within the first computer system's operating system, the file system type interface being accessible by the first computer system's operating system.

18. A method as recited in claim 16 wherein the operating system type interface resembles a DOS operating system interface.

19. A method as recited in claim 17 wherein the file system type interface is further configured to provide the device data as a device tree that is compliant with IEEE 1275 during boot up of the second computer system.

20. A method as recited in claim 18 wherein the debugging tool is configured to operate through the DOS operating system interface.

21. A boot system for loading a first operating system within a first computer system having a plurality of peripheral devices, the first operating system allocating computer resources to the peripheral devices, the boot system comprising:

a configuration program capable of obtaining information regarding the peripheral devices of the first computer system and generating or revising a set of device data based on the obtained information prior to loading the first operating system and its associated operating system type interface, wherein the configuration program has an associated operating system type interface; and a boot program arranged to load the first operating system of the first computer system and its associated operating system type interface such that the first operating system allocates computer resources of the first computer system based on the device data.

22. A boot system as recited in claim 21 wherein the operating system type interface resembles a operating system interface of an operating system used in the development of the configuration program.

23. A boot system as recite in claim 22 wherein the operating system type interface is configured to permit debugging of the configuration program by allowing use of a standard debugging tool that interfaces with the operating system used in the development of the configuration program.

* * * * *

UNITED STATES PATENT AND TRADEMARK OFFICE
CERTIFICATE OF CORRECTION

PATENT NO. : 6,263,378 B1
DATED : July 17, 2001
INVENTOR(S) : Rudoff et al.

It is certified that error appears in the above-identified patent and that said Letters Patent is hereby corrected as shown below:

Column 6,
Line 30, change "allocation" to -- allocating --.

Signed and Sealed this

Fifth Day of March, 2002

Attest:

JAMES E. ROGAN
Attesting Officer
Director of the United States Patent and Trademark Office